Dec. 4, 1962
W. F. MOORE
3,066,887
SPACE BELT
Filed May 9, 1960
3 Sheets-Sheet 1
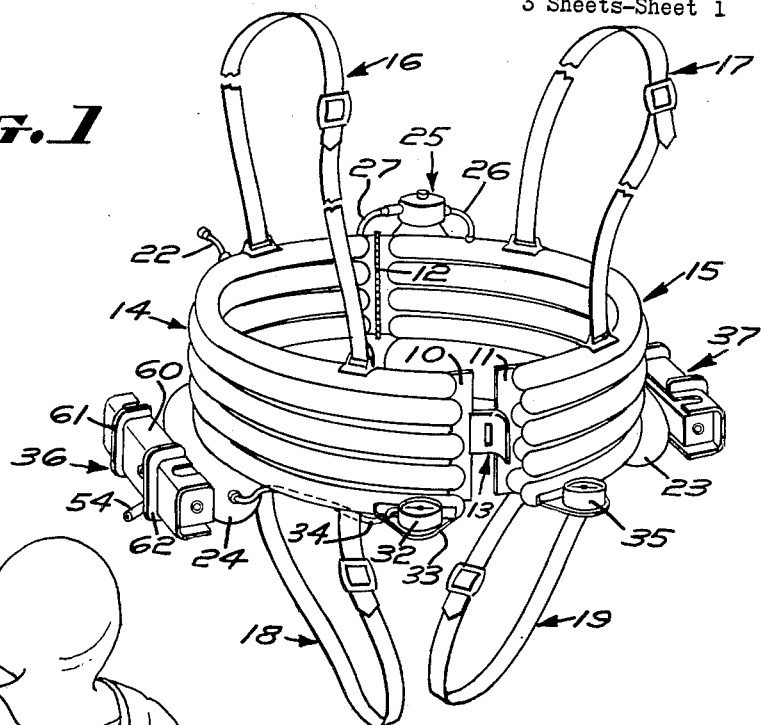
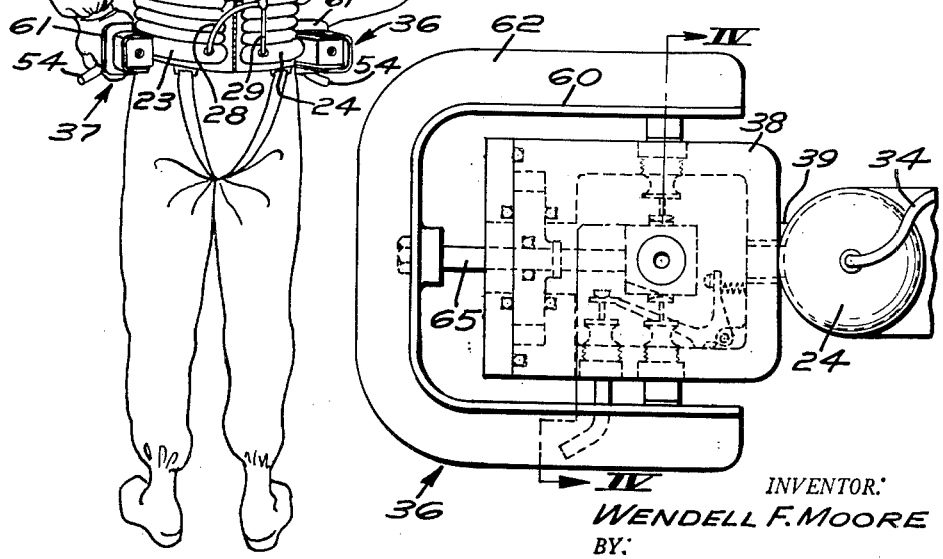
INVENTOR:
WENDELL F. MOORE
BY:
Beau, Brooks, Buckley & Beau,
ATTORNEYS.

Dec. 4, 1962 W. F. MOORE 3,066,887
SPACE BELT
Filed May 9, 1960 3 Sheets-Sheet 2
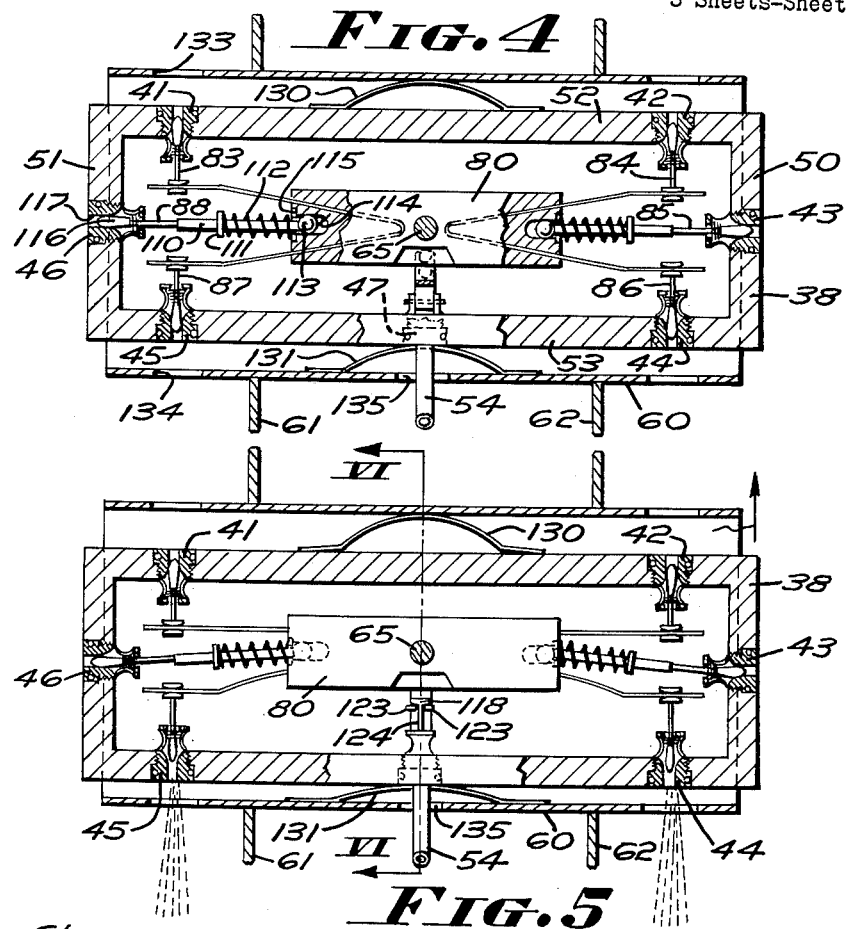
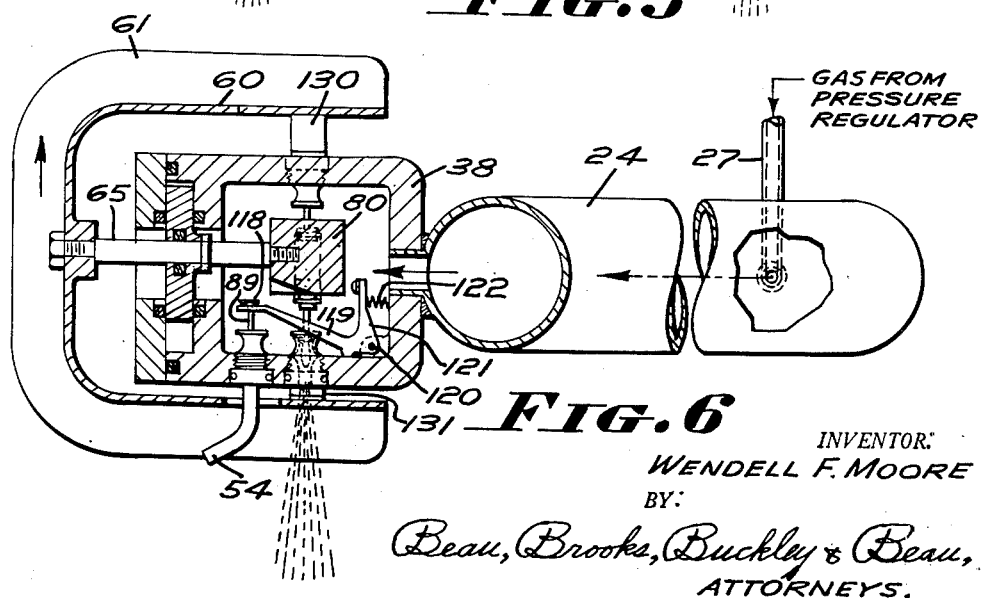
INVENTOR.
WENDELL F. MOORE
BY:
Beau, Brooks, Buckley & Beau,
ATTORNEYS.

Dec. 4, 1962 W. F. MOORE 3,066,887
SPACE BELT
Filed May 9, 1960 3 Sheets-Sheet 3
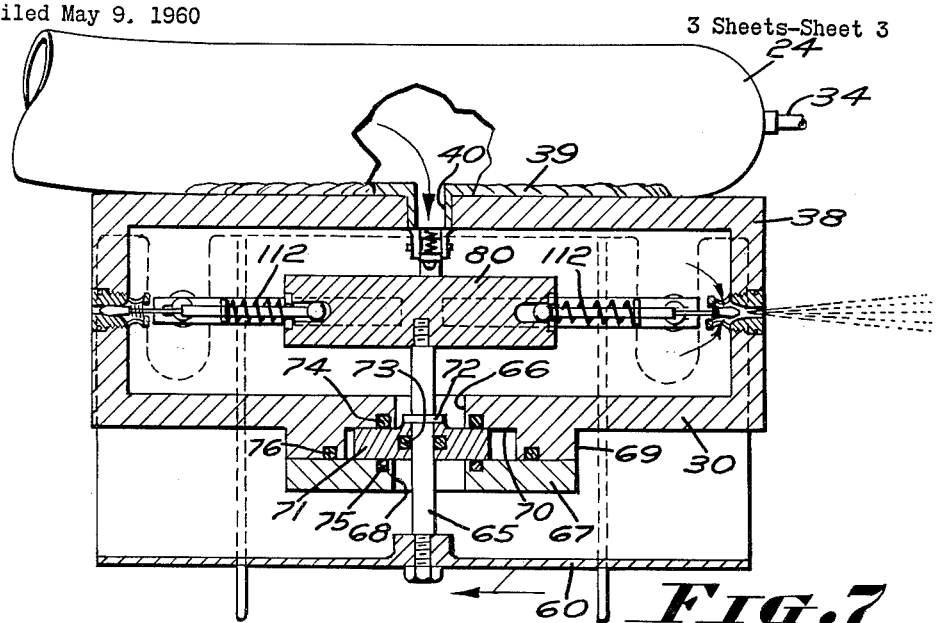
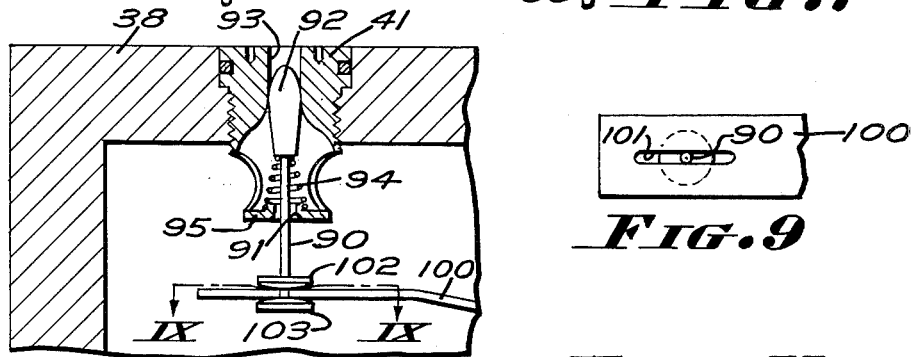
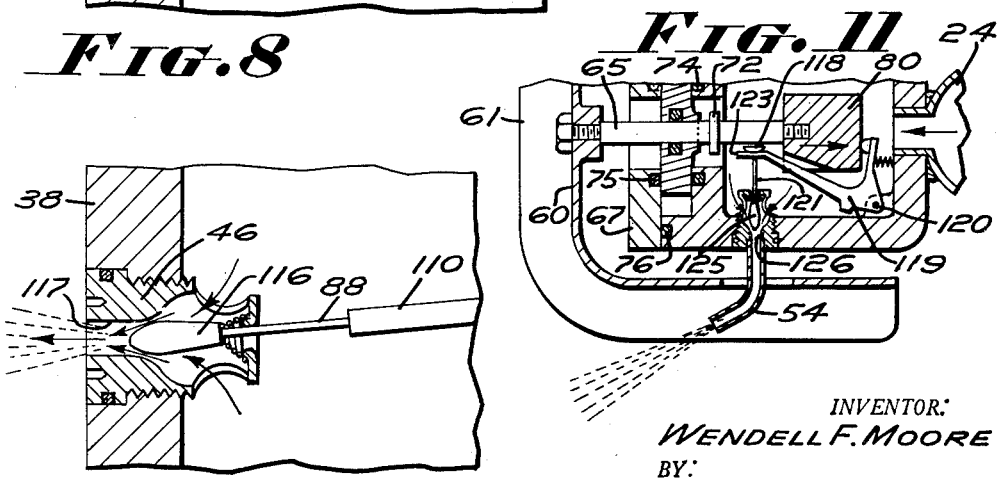
INVENTOR:
WENDELL F. MOORE
BY:
Beau, Brooks, Buckley & Beau,
ATTORNEYS.

3,066,887
SPACE BELT
Wendell F. Moore, Youngstown, N.Y., assignor, by mesne assignments, to Bell Aerospace Corporation, Wheatfield, N.Y., a corporation of Delaware
Filed May 9, 1960, Ser. No. 27,792
7 Claims. (Cl. 244—4)

This invention relates to a device for propelling objects in space at or near zero gravity conditions, and more particularly pertains especially to a device adapted for use in conjunction with an individual user or an enclosing capsule therefor.

Of principal concern in connection with this invention is the provision of means for propelling, rotating or moving in any one of a given number of desired directions or planes any object to which the device is attached, and for this purpose, the mechanism is provided with means for exerting thrust in one or more directions to effect the desired motion.

More especially, an object of the present invention is to provide a device wherein the actuating mechanism is moved in the direction in which the movement is desired, for example, the present invention is provided with actuating means which when moved forwardly produces a forward thrust or movement, which when moved upwardly produces an upward motion, etc. This is accomplished by means of manifold blocks provided with a plurality of orifices therein, each one of which is normally closed but which is so connected to the control mechanism or actuating mechanism as to be selectively uncovered in accordance with the direction of motion or actuation of such mechanism. In this fashion, a simple and entirely effective propulsion means is provided.

Further, the present invention utilizes preferably a gaseous propellant which is stored in tube bundles encircling wholly or at least in part the user's waist at or near the center of gravity and with the propelling manifold assemblies being attached rigidly thereto for direct connection to the tube bundles through suitable pressure reducing mechanism as is necessary or desirable for educting the gaseous medium in the proper direction in accordance with the control mechanism under the control of the operator.

Essentially, then, the primary object of the present invention is to provide a mechanism incorporating high pressure propellant reservoir means having thrust producing manifold mechanism attached thereto through suitable pressure reduction mechanism and in which the manifold mechanism has associated therewith and forming a part thereof novel actuating mechanism for producing the requisite thrust.

With the above, and other objects in view that will hereinafter appear, the nature of the invention will be more clearly understood by reference to the following detailed description, the appended claims, and the several views illustrated in the accompanying drawings, in which:

FIGURE 1 is a perspective view of a preferred embodiment of the present invention;

FIGURE 2 is a view showing the form of the invention shown in FIGURE 1 fitted for use;

FIGURE 3 is an end elevational view of one of the manifold mechanisms;

FIGURE 4 is a vertical section taken substantially along the plane of section line IV—IV in FIGURE 3, showing details of the internal mechanism of one of the manifold assemblies;

FIGURE 5 is a view similar to FIGURE 4 but showing the actuating mechanism in position to produce an upward thrust;

FIGURE 6 is a transverse vertical section taken substantially along the plane of section line VI—VI of FIGURE 5, and illustrating further details of the valve mechanism internally of the manifold;

FIGURE 7 is a horizontal section taken through the valve and manifold assembly, showing the parts in position to produce a forward thrust;

FIGURE 8 is an enlarged sectional view showing one of the thrust orifices and the valve mechanism associated therewith;

FIGURE 9 is a view taken substantially along the plane of section line IX—IX in FIGURE 8, showing the connection between one of the valve actuating fingers and the valve itself;

FIGURE 10 is an enlarged view showing one of the valve mechanisms in open position; and FIGURE 11 is a sectional view showing one of the lateral thrust orifices in open position.

Referring at this time more particularly to FIGURE 1, the preferred embodiment of the device as shown therein will be seen to include a pair of semicircular rigid band members 10 and 11 joined at corresponding ends thereof by means of a hinge element 12, and being provided at their opposite ends with a suitable buckle or latch mechanism indicated generally by the reference character 13, and by means of which the device may be secured about a user's waist. The semicircular bands 10 and 11 provide mounting means for tube bundles indicated generally by the reference characters 14 and 15 and which are filled with propellant, such as liquefied gas or high pressure gas.

Connected to the top of the tube bundles are a pair of adjustable shoulder straps indicated generally by the reference characters 16 and 17 and on the lower side thereof are adjustable groin straps 18 and 19. The manner in which the device is fitted to a user is illustrated in FIGURE 2 of the drawings. This figure also illustrates the flexible line 20 which interconnects the two tube bundles 14 and 15, one of which is provided with a filling nipple 22, see particularly FIGURE 1. FIGURE 2 also illustrates clearly the manner in which the tube bundles are connected to the pressure manifolds 23 and 24 through a pressure regulator 25. The pressure regulator is provided with a line 26 leading from the high pressure tube bundles, and on the low pressure side thereof, there is a line 27 leading to the two manifolds 23 and 24 through the branches 28 and 29. It will be appreciated that the lines 27, 28 and 29, or at least portions thereof are flexible to permit the hinge action between the two bands 10 and 11.

Referring again to FIGURE 1, it will be seen that a low pressure gauge 32 is mounted on a suitable bracket 33 at the front of the belt and this gauge is connected through a suitable line 34 to the pressure manifold 24. A further pressure gauge 35 is mounted on a similar bracket at the opposite side of the belt at the front, and this gauge is connected directly to the tube bundle 15. In this manner, the operator can very easily determine the reserve in the tube bundles by reference to the gauge 35, and can ascertain the correct setting of the pressure regulator 25 by reference to the gauge 32.

Mounted at either side of the belt directly upon the low pressure manifolds 23 and 24 are valve block assemblies, indicated generally by reference characters 36 and 37, see particularly FIGURE 1. Each of these valve block assemblies, as can be seen most clearly in FIGURE 3, includes a main body portion 38 suitably secured, as by welding 39, to its associated manifold 24 in this particular instance. The manifolds, see particularly FIGURE 7, are provided with nipples 40 communicating with the interior thereof and extending into the body 38 of each associated valve block so as to subject the interior of the bodies 38 to the same pressure as is present in the manifolds 23 and 24.

The body 38 in each instance is provided with a plurality of orifices either formed directly therein or by threaded orifice members 41, 42, 43, 44, 45, 46 and 47, as shown in FIGURE 4. The multiplicity of such orifices or orifice members as shown in FIGURE 4 constitutes the total number of orifices preferred. However, in any event, at least one orifice is provided on the forward end 50 of the valve body, at least one on the rear wall 51 of the body, at least one on the top wall 52, at least one on the bottom wall 53, as well as an additional orifice with which is associated at least one nozzle 54 for exerting lateral thrust, as will be presently apparent.

Referring again to FIGURES 1 and 3, the actuating mechanism for the valve in each case includes a channel-shaped member 60 having positioning guards 61 and 62 thereon. As can be seen from FIGURE 2, the operator's hands grip the channel member 60, being positioned between the guard or positioning portions 61 and 62. The channel member 60 is provided with an actuating stem 65 which projects laterally inwardly thereof through an enlarged opening 66 in the valve body 38, see particularly FIGURE 7. A cover plate 67 is fastened in any suitable manner to the outside of the valve body 38 and is provided with an enlarged opening 68 aligned with the opening 66, as shown. The portion of the valve body 38 upon which the cover plate 67 is mounted is thickened to provide a boss 69 having a counterbore 70 therein which receives a disk 71 slidably therewithin. It will be seen that the actuating rod 65 is very much smaller than either of the openings 66 or 68 so that it may move up and down, sideways, or in any direction therewithin. The actuating rod 65 is provided with a shoulder or collar 72 which is rigid therewith and which limits outward movement of the channel member 60, as will be appreciated. The actuating rod 65 is slidably disposed within a central opening in the disk member 71 and the disk is provided with a suitable O-ring or seal 73 engaging grippingly about the actuating rod 65 to prevent pressure loss from this source. Likewise, the valve body is provided with an O-ring 74 and the cover plate 67 is provided with an O-ring 75 engaging the disk 71 on opposite sides thereof to obviate pressure loss in this region. Additionally, a further O-ring 76 may be provided between the boss portion 69 of the valve body 38 and the cover plate 67. In any event, it is preferred that suitable effective sealing means be provided in the region of the actuating rod 65 to prevent pressure loss or loss of propellant as much as is practicable.

Fixed to the inner end of the actuating rod 65 is an actuating block 80 which, by virtue of the mounting of the actuating rod 65 slidably in the disk 71 and further by virtue of the slidable movement of the disk 71 between the cover plate 67 and the valve body 38 within the counterbore 70, can move in any direction within the interior of the valve body 38. However, for performing the desired propelling motions, the valve actuating block 80 will normally be moved only fore or aft, either up or down, or may be depressed inwardly (upwardly in FIGURE 7) for selectively uncovering one or more of the several orifices in the valve body 38.

Each of the orifices has associated therewith a valve member, such as those indicated by reference characters 83, 84, 85, 86, 87 and 88, as shown in FIGURE 4, for the respective associated orifice members 41–46. Additionally, the orifice member 47 has associated therewith a valve member 89, see particularly FIGURE 6. The several valve members 83, 84, 86, 87 and 89 are preferably substantially identically formed. For the purpose of their operation, reference is had more particularly at this time to FIGURE 8, wherein it will be seen that each such of the above-mentioned valve members includes a stem portion 90 projecting through an enlarged opening 91 in the corresponding orifice member, 41 in this particular instance, and which stem carries an enlarged head portion 92 movable into and out of closing contact with the associated orifice 93. A compression spring 94 is seated on the inner end wall 95 of the orifice member 41 within which the opening 91 is formed and engages the inner side of the enlarged head 92 of the valve so as to normally urge the same into closing engagement with the associated orifice 93. The closing action of each valve, of course, is enhanced by virtue of the fact that the pressure within the valve body 38 will be much higher than the ambient pressure. As a matter of fact, for all practical purposes, the pressure differential existing will be substantially equal to the pressure within the valve bodies.

For the purpose of actuating the valve 92, the actuating block 80 is provided with a resilient spring finger 100 provided with an elongate opening 101 therein, see particularly FIGURE 9. The stem 90 of the valve projects through this elongate opening and on either side thereof, sandwiching the finger 100 therebetween, are stop members 102 and 103. In this fashion, it will be apparent that movement of the finger or lever 100 in FIGURE 8 either left or right will not effect opening action of the valve 92 because of the lost motion of the stem 90 within the slot or elongate opening 101. However, if the finger 100 is moved downwardly in FIGURE 8, the valve 92 will be moved to open position so that the propellant can escape through the orifice 93 and effect a thrust correspondingly.

The two valve members 85 and 88 are similarly formed and, as can be best seen in FIGURE 4, each such valve member includes an elongate stem 110 provided with a shoulder or collar 111 thereon against which one end of a compression spring 112 is seated, the opposite end being seated against the valve actuating block 80. The stem 110 terminates at its inner end in an enlarged spherical head 113 received in an elongate socket 114 in the corresponding end of the actuator block. The outer end of each socket 114 is provided with a counterbore within which is fitted a stop member 115 which prevents complete withdrawal of the spherical head 113. In this fashion, it will be seen that movement of the valve actuator block 80 to the right in FIGURE 4 will permit movement of the head 113 until it engages the stop member 115, whereafter continued movement of the actuator block 80 will move the stem 110 to the right in FIGURE 4 and open the orifice member 46 by withdrawing the valve head 116 from seated engagement with the orifice 117.

Referring at this time more particularly to FIGURE 6, it will be appreciated that the valve member 89 is substantially identical to the valve members 83, 84, 86 and 87 except that it is provided with only one stop member 118. For the purpose of the actuation of this valve member 89, there is provided a bell-crank 119 pivotally mounted, as at 120, within the interior of the housing 38 and having an upstanding leg 121 disposed in the inward path of movement of the valve actuator block 80. A compression spring 122 normally urges the bellcrank to valve closing position, but when the block 80 is moved inwardly, as is shown in FIGURE 11, the bellcrank 119 is pivoted about its pivot point 120 so that its bifurcated end portion 123 which straddles the stem 124 of the valve will lift up, through the medium of the stop member 118 on the valve stem and unseat the valve head 125 from the orifice 126 leading to the nozzle 54, thus directing a lateral force on the user.

From the above, it will be clearly apparent that the valve actuating mechanism is extremely practical and efficient, particularly in view of the fact that the motion imparted to the actuating mechanism by the user will effect a corresponding motion to his body. For example, when the two members 60 are moved forwardly, the rearward orifice members are uncovered so that the propellant escapes from the rear of the valve housing, thus imparting a forward motion to the user. Conversely, rearward movement of the actuators uncovers the orifice members at the forward end of the valve bodies 38, imparting rearward motion. Likewise, lifting up on the actuating mechanism exerts a lifting force and pushing downwardly exerts a lowering force. The nozzles 54, since they are laterally directed, will impart lateral motion to the user and, of course, are utilized only one at a time. For example, should the user wish to move to the left, he opens the right hand valve thus causing a reaction jet to escape on the right side with a resultant motion to the left. It will also be readily appreciated that rotation can be easily effected either by pushing forwardly or rearwardly on only one actuator, or pushing in opposite directions on both. A lateral rotating motion of the user's body may be effected similarly by either lifting up or pushing down on only one actuator or imparting opposite such directions to both. Also, compound motion is easily effected by skillful manipulation of the actuating mechanism. For example, lifting up and moving forwardly will impart an upwardly angled motion. In this fashion, it will be readily apparent that the operator may very easily move in any direction in which he chooses.

As can be seen most clearly in FIGURES 4 and 5, resilient spring elements 130 and 131 are provided for centralizing the actuating hand grip members 60 between the up and down positions. The springs 112, on the other hand, centralize the actuator between fore and aft positions, and the spring members 122 will tend to centralize the actuating mechanism in a lateral direction. FIGURES 4 and 5 also clearly illustrate that the actuating member 60 is provided with suitable openings or cut away portions, such as those indicated by reference characters 133 and 134, to clear the discharge from the orifice members 41, 42, 44 and 45. Additionally, the member 60 is provided with an opening 135 clearing the nozzle 54, as will be readily apparent. FIGURE 5 clearly illustrates the position of the various component parts during a lifting motion when the orifice members 44 and 45 are open. This is also shown in FIGURE 6. FIGURE 10 illustrates the position of parts during a forward motion, whereas FIGURE 7 illustrates the position of component parts during a rearward motion, and FIGURE 4 shows all valve elements in closed position.

It will further be appreciated that the propellant may be any suitable substance. For example, it may be simply compressed air or similar propellant, or it could be hydrogen peroxide-catalyst, lithium-water or other reaction type propellants. Also, alternate designs or variations within the scope of this invention could utilize storage tanks or spheres on the back or elsewhere instead of the tube bundles. Also, it will be readily appreciated that this mechanism may be incorporated practically in conjunction with a capsule containing an individual, in which case, the man would be inside the capsule and the fundamental thrust-controller device would then merely be attached to the outside with the manual grips or levers protruding inside and suitably positioned to be operated by the hands or feet, as desired.

What is claimed is:

1. A zero gravity propelling device comprising propellant storage means, a pair of manifolds connected to said propellant storage means, and valve blocks connected to said manifolds, each valve block having a plurality of orifices therein for directing propellant therefrom upwardly, downwardly, fore, aft and laterally thereof, valve means for each of such orifices and common actuator means for said valve means for selectively uncovering said orifices, and means for securing said device in relatively fixed relation to a body to be propelled.

2. A zero gravity propelling device comprising propellant storage means, a pair of manifolds connected to said propellant storage means, and valve blocks connected to said manifolds, each valve block having a plurality of orifices therein for directing propellant therefrom upwardly, downwardly fore, aft and laterally thereof, and valve means for each of such orifices and common actuator means for said valve means for selectively uncovering said orifices, said propellant storage means being in the form of arcuate tube bundles hingedly inter-connected at one end and provided with releasable buckle means at the opposite end whereby the tube bundle may be positioned about a user's waist.

3. A zero gravity propelling device comprising propellant storage means, a pair of manifolds connected to said propellant storage means, and valve blocks connected to said manifolds, each valve block having a plurality of orifices therein for directing propellant therefrom upwardly, downwardly, fore, aft and laterally thereof, and valve means for each of such orifices and common actuator means for said valve means for selectively uncovering said orifices, said common actuator means being in the form of a block to which all of said valve means are connected, each such valve means having its connection to the block through lost motion mechanism preventing actuation of the valve means in all but one direction of movement of the block for each such valve means, whereby actuation of an individual valve means is ineffective to actuate other of the valve means.

4. A zero gravity propelling mechanism including a valve housing having a hollow interior and provided with front and rear walls, upper and lower walls, each provided with at least one orifice therein, a valve member mounted in association with each such orifice and having means associated therewith normally urging each such valve member into closing engagement with its associated orifice, an actuating rod extending into said housing for movement laterally inwardly thereof, fore and aft and up and down relative thereto, an actuator block secured to the inner end of said actuator rod, the valve members associated with the orifices in said upper and lower walls being connected to said actuator block through elongate resilient fingers whereby the valve member in association with the orifice in the upper wall will be actuated only upon downward movement of said actuator block and the valve member associated with the lower wall will be actuated only in response to upward movement of said actuator block, said valve members associated with the orifices in the front and rear walls of the housing being directly connected to said actuator block but being capable of limited lost motion relative thereto, spring means operating between the last mentioned of said valve members and said actuator block normally urging such valve members towards seated position but capable of being depressed until the limit of motion between one or the other of said valve members.

5. A zero gravity propelling mechanism including a valve housing having a hollow interior and provided with front and rear walls, upper and lower walls, each provided with at least one orifice therein, a valve member mounted in association with each such orifice and having means associated therewith normally urging each such valve member into closing engagement with its associated orifice, an actuating rod extending into said housing for movement laterally inwardly thereof, fore and aft and up and down relative thereto, an actuator block secured to the inner end of said actuator rod, the valve members associated with the orifices in said upper and lower walls being connected to said actuator block through elongate resilient fingers whereby the valve member in association with the orifice in the upper wall will be actuated only upon downward movement of said actuator block, said valve members associated with the orifices in the front and rear walls of the housing being directly connected to said actuator block but being capable of limited lost motion relative thereto, spring means operating between the last mentioned of said valve members and said actuator block normally urging such valve members towards seated position but capable of being depressed until the limit of motion between one or the other of said valve members, an actuating handle secured to the outer end of said actuator rod having a manual grip portion thereon for imparting motion to said actuator block.

6. A zero gravity propelling mechanism including a valve housing having a hollow interior and provided with front and rear walls, upper and lower walls, each provided with at least one orifice therein, a valve member mounted in association with each such orifice and having means associated therewith normally urging each such valve member into closing engagement with its associated orifice, an actuating rod extending into said housing for movement laterally inwardly thereof, fore and aft and up and down relative thereto, an actuator block secured to the inner end of said actuator rod, the valve members associated with the orifices in said upper and lower walls being connected to said actuator block through elongate resilient fingers whereby the valve member in association with the orifice in the upper wall will be actuated only upon downward movement of said actuator block, said valve members associated with the orifices in the front and rear walls of the housing being directly connected to said actuator block but being capable of limited lost motion relative thereto, spring means operating between the last mentioned of said valve members and said actuator block normally urging such valve members towards seated position but capable of being depressed until the limit of motion between one or the other of said valve members, an actuating handle secured to the outer end of said actuator rod having a manual grip portion thereon for imparting motion to said actuator block, and spring means between the upper and lower walls of said valve body and said actuating handle normally urging the latter towards a centrallized position vertically relative thereto.

7. A zero gravity propelling mechanism including a valve housing having a hollow interior and provided with front and rear walls, upper and lower walls, each provided with at least one orifice therein, a valve member mounted in association with each such orifice and having means associated therewith normally urging each such valve member into closing engagement with its associated orifice, an actuating rod extending into said housing for movement laterally inwardly thereof, fore and aft and up and down relative thereto, an actuator block secured to the inner end of said actuator rod, the valve members associated with the orifices in said upper and lower walls being connected to said actuator block through elongate resilient fingers whereby the valve member in association with the orifice in the upper wall will be actuated only upon downward movement of said actuator block, said valve members associated with the orifices in the front and rear walls of the housing being directly connected to said actuator block but being capable of limited lost motion relative thereto, spring means operating between the last mentioned of said valve members and said actuator block normally urging such valve members towards seated position but capable of being depressed until the limit of motion between one or the other of said valve members, said bottom wall having a further orifice therein and a nozzle connected thereto directed laterally outwardly from said valve body, a bellcrank mounted within said valve body in the path of inward motion of said valve block and having one arm engageable therewith and the opposite arm engaged with a valve member associated with the last mentioned orifice leading to said nozzle.

References Cited in the file of this patent

FOREIGN PATENTS 715,102  Great Britain _____ Sept. 8, 1954

OTHER REFERENCES

Popular Mechanics, July 1959, vol. 112, page 76.